United States Patent
Kato

(10) Patent No.: US 10,424,768 B2
(45) Date of Patent: Sep. 24, 2019

(54) BATTERY PACK

(71) Applicant: TOYOTA JIDOSHA KABUSHIKI KAISHA, Toyota-shi, Aichi (JP)

(72) Inventor: Masaki Kato, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 104 days.

(21) Appl. No.: 15/704,062

(22) Filed: Sep. 14, 2017

(65) Prior Publication Data

US 2018/0083240 A1 Mar. 22, 2018

(30) Foreign Application Priority Data

Sep. 16, 2016 (JP) ................................ 2016-182413

(51) Int. Cl.
| | |
|---|---|
| *H01M 2/10* | (2006.01) |
| *H01M 2/02* | (2006.01) |
| *H01M 2/12* | (2006.01) |
| *H01M 10/04* | (2006.01) |
| *H01M 10/617* | (2014.01) |
| *H01M 4/13* | (2010.01) |
| *H01M 4/70* | (2006.01) |

(52) U.S. Cl.
CPC .......... *H01M 2/1077* (2013.01); *H01M 4/13* (2013.01); *H01M 4/70* (2013.01); *H01M 10/0413* (2013.01); *H01M 10/617* (2015.04); *H01M 2220/20* (2013.01)

(58) Field of Classification Search
CPC .......... H01M 2/10; H01M 2/02; H01M 10/04; H01M 10/617
See application file for complete search history.

(56) References Cited

U.S. PATENT DOCUMENTS

| | | | |
|---|---|---|---|
| 2009/0047575 A1 | 2/2009 | Abe et al. | |
| 2015/0171411 A1* | 6/2015 | Kobayashi | H01M 2/22 429/61 |

(Continued)

FOREIGN PATENT DOCUMENTS

| | | |
|---|---|---|
| JP | 2003-031187 A | 1/2003 |
| JP | 2007-335294 A | 12/2007 |

(Continued)

*Primary Examiner* — Kenneth J Douyette
(74) *Attorney, Agent, or Firm* — Sughrue Mion, PLLC

(57) ABSTRACT

Provided is a battery pack having a plurality of single cells connected to one another, the battery pack being capable of preventing a temperature elevation caused by a short-circuit current that is generated when a sharp conductive foreign matter penetrates each of the single cells. The battery pack disclosed herein is a battery pack that has single cells arranged adjacent to each other, these adjacent single cells being electrically connected in series. In this battery pack, among a plurality of positive and negative electrode sheets configuring layered electrode bodies of the respective single cells, a negative electrode sheet is disposed on the lowermost stream side in the arrangement direction, and this negative electrode sheet disposed on the lowermost stream side is configured to have a lower electric resistance than the other negative electrode sheets configuring the layered electrode bodies and to break at a temperature lower than the temperatures at which the other negative electrode sheets break.

3 Claims, 4 Drawing Sheets

(56) References Cited

U.S. PATENT DOCUMENTS

| | | |
|---|---|---|
| 2016/0181606 A1 | 6/2016 | Suga et al. |
| 2017/0214031 A1* | 7/2017 | Lee .................. H01M 2/02 |
| 2017/0222280 A1 | 8/2017 | Asano et al. |

FOREIGN PATENT DOCUMENTS

| | | | |
|---|---|---|---|
| JP | 2009-64767 A | 3/2009 | |
| JP | 2009-266402 A | 11/2009 | |
| JP | 2016-119154 A | 6/2016 | |
| WO | 2016/051639 A1 | 4/2016 | |
| WO | 2016-093590 A1 * | 6/2016 | ............ H01M 10/04 |

* cited by examiner

BATTERY PACK

BACKGROUND OF THE INVENTION

1. Field of the Invention

The present invention relates to a battery pack. More specifically, the present invention relates to a battery pack having, as single cells, a plurality of secondary cells connected to one another. This application claims priority to Japanese Patent Application No. 2016-182413, filed on Sep. 16, 2016, the entire contents of which are hereby incorporated by reference into the present application.

2. Description of the Related Art

Battery packs in which, as single cells, a plurality of secondary cells such as lithium-ion secondary cells and nickel-hydrogen cells or power storage elements such as capacitors are connected in series or in parallel by bus bars, have become increasingly important as the in-car power sources or the power sources for personal computers, portable terminals and the like. Particularly, due to their light weights and high-energy densities, the battery packs having lithium-ion secondary cells as single cells have favorably been used in the in-car high-output power sources and the like.

The lithium-ion secondary cells used as the single cells are each generally configured by storing an electrode body with sheet-shaped positive and negative electrodes in a battery case. In recent years, in order to improve battery performance, there has been developed the lithium-ion secondary cell with a layered electrode body in which rectangular positive and negative electrode sheets are layered.

A battery pack having a plurality of such lithium-ion secondary cells connected to one another is required to provide a high level of safety, not to mention excellent battery performance. For example, in some cases when single cells produce heat during use, the single cells add heat to one another, increasing the temperature of the entire battery pack. In this case, materials inside the single cells become denatured by heat, possibly ruining the physical or chemical stability thereof.

In order to keep the stability by preventing the increase in the temperatures of the cells, countermeasures such as the ones described in Japanese Patent Application Laid-open No. 2003-31187 and Japanese Patent Application Laid-open No. 2009-266402 have been proposed. Japanese Patent Application Laid-open No. 2003-31187, for example, describes a secondary cell and a battery pack with a plurality of the secondary cells in which an endothermic agent composed of a compound capable of conducting an endothermic reaction is added to an envelope film or an enveloping pack material of the secondary cell and the battery pack, in order to inhibit a temperature increase that can occur upon abnormal heat production of the cells.

SUMMARY OF THE INVENTION

However, in constructing a battery pack by connecting in series a plurality of single cells having layered electrode bodies, positioning the endothermic agent as described in above literature 1 or 2 often could not inhibit a temperature increase of each single cell. For example, when a mobile object such as a vehicle is mounted with the foregoing battery pack and moved, a sharp conductive foreign matter such as a nail can puncture into the battery pack from the front in the moving direction. When such conductive foreign matter penetrates each of the single cells, short circuit occurs in each single cell and consequently an electric current flows rapidly to the conductive foreign matter, generating Joule heat. This might drastically increase the internal temperature of each single cell.

Specifically, when a sharp conductive foreign matter F punctures into a battery pack 100 having the structure shown in FIG. 4 and penetrates each of single cells 110A, 110B, a short-circuit current E1 flows from a positive electrode sheet 132 toward a negative electrode sheet 134 through this conductive foreign matter F. In such a case, Joule heating (resistive heating) of the short-circuit current E1 flowing through the conductive foreign matter F raises the internal temperatures of the single cells 110A, 110B.

Moreover, when the conductive foreign matter F penetrates both of the single cells 110A, 110B, sometimes a short-circuit current E2 is generated between the plurality of single cells 110A, 110B through bus bars 140. Specifically, when the conductive foreign matter F penetrates both of the single cells 110A, 110B, a conductive path is created by the positive electrode sheet 132 of the single cell 110B, the bus bars 140, the negative electrode sheet 134 of the single cell 110A, and the conductive foreign matter F. As a result, the short-circuit current E2 of approximately 700 A flows from the positive electrode sheet 132 of the downstream-side single cell 110B toward the negative electrode sheet 134 of the upstream-side single cell 110A. And then when this short-circuit current E2 flows through the conductive foreign matter F, Joule heating of this current raises the temperature of the downstream-side single cell 110B considerably. In a battery pack in which two or more single cells are connected to one another, this temperature elevation by the short-circuit current E2 occurs in all of the second and subsequent single cells.

The present invention was contrived in view of the foregoing circumstances, and a main object of the present invention is to provide a battery pack having a plurality of single cells connected to one another, the battery pack being designed to prevent a temperature elevation that is caused by a short-circuit current between the plurality of single cells when a sharp conductive foreign matter penetrates each of the single cells.

A battery pack disclosed herein is a battery pack that has a plurality of single cells of an identical shape arranged adjacent to each other, the adjacent single cells having positive and negative electrode terminals electrically connected alternately in series. Among the plurality of arranged single cells, the single cell located at one end of the arrangement direction has the positive electrode terminal serving as a positive electrode output terminal that is opened so as to be connectable to the outside, and the single cell located at the other end of the arrangement direction has the negative electrode terminal serving as a negative electrode output terminal that is opened so as to be connectable to the outside.

Each of the single cells of the battery pack disclosed herein has a layered electrode body in which a plurality of rectangular positive and negative electrode sheets are layered alternately with separators therebetween, and a square battery case corresponding to the layered electrode body, the direction of layering of the positive and negative electrodes configuring the layered electrode body being the same as the arrangement direction of the plurality of single cells.

In the following description, the single cell that has the positive electrode output terminal and is located at one end is "a first single cell", and the single cell that has the negative electrode output terminal and is located at the other end is "an n-th single cell". In addition, the side in the arrangement direction where the first single cell is located corresponds to an upstream side, whereas the side where the n-th single cell is located corresponds to a downstream side.

In the battery pack disclosed herein, among a plurality of positive and negative electrode sheets that configure the layered electrode body of each of the single cells from the first single cell to at least an n−1$^{th}$ single cell, a negative electrode sheet is disposed on a lowermost stream side in the arrangement direction, and the negative electrode sheet disposed on the lowermost stream side has a lower electric resistance than the other negative electrode sheets configuring the layered electrode body and breaks at a temperature lower than temperatures at which the other negative electrode sheets break.

Next is described a situation where a sharp conductive foreign matter punctures the battery pack of the foregoing structure from the upstream side toward the downstream side in the arrangement direction (i.e., from the first single cell to the n-th single cell) and then penetrates each of the single cells.

As described above, when a conductive foreign matter penetrates each of the single cells configuring a battery pack, a short-circuit current flows, through the bus bars, from the positive electrode sheets of the single cells arranged on the downstream side toward the negative electrode sheets of the single cells arranged on the upstream side. Joule heating that is caused by the short-circuit current flowing through the conductive foreign matter raises the temperatures of the single cells arranged on the downstream side.

In the battery pack disclosed herein, on the other hand, the electric resistance of the negative electrode sheet on the lowermost stream side is set to be lower than those of the other negative electrode sheets. Therefore, a short-circuit current concentrically flows into the negative electrode sheet on the lowermost stream side via the bus bars. Because the negative electrode sheet on the lowermost stream side is configured to break at a temperature lower than temperatures at which the other negative electrode sheets break, when a conductive foreign matter penetrates each of the single cells and consequently a short-circuit current flows via the bus bars, the negative electrode sheet on the lowermost stream side breaks first, thereby shutting off the short-circuit current. Therefore, even when a sharp conductive foreign matter penetrates each of the single cells, the temperature elevation caused by a short-circuit current between the plurality of single cells can be inhibited.

According to a preferred aspect of the battery pack disclosed herein, the weight per unit area of a negative electrode active material layer of the negative electrode sheet disposed on the lowermost stream side is 25% to 75% of the weight per unit area of negative electrode active material layers of the other negative electrode sheets. Therefore, the electric resistance of the negative electrode sheet located on the lowermost stream side can be made lower than those of the other negative electrode sheets. Consequently, a short-circuit current can be applied appropriately to the negative electrode sheet on the lowermost stream side, breaking the negative electrode sheet on the lowermost stream side first.

According to another preferred aspect of the battery pack disclosed herein, the thickness of a negative electrode current collector of the negative electrode sheet disposed on the lowermost stream side is 70% to 90% of the thicknesses of negative electrode current collectors of the other negative electrode sheets. Therefore, the durability of the negative electrode sheet located on the lowermost stream side can be lowered. Consequently, when a short-circuit current flows in, the negative electrode sheet located on the lowermost stream side can be broken at a temperature lower than the temperatures at which the other negative electrode sheets break.

DESCRIPTION OF THE PREFERRED EMBODIMENT

A battery pack having, as single cells, a plurality of lithium-ion secondary cells connected to one another is now described hereinafter as an example of a battery pack according to an embodiment of the present invention. In the battery pack disclosed herein, the cells used as the single cells are not limited to the lithium-ion secondary cells; thus, for example, nickel-hydrogen cells and other cells having layered electrode bodies can be used. Note that, in the present specification, such an expression as "A to B" (A and B each represent a number) in a numerical value range means "equal to or greater than A, but equal to or less than B."

1. Battery Pack

Figure 1:
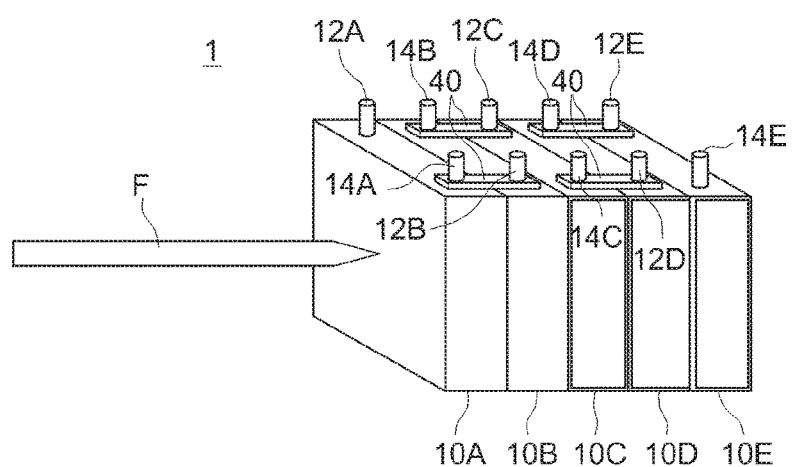
FIG. 1 is a perspective view schematically showing a battery pack according to an embodiment of the present invention and a conductive foreign matter.
Figure 2:
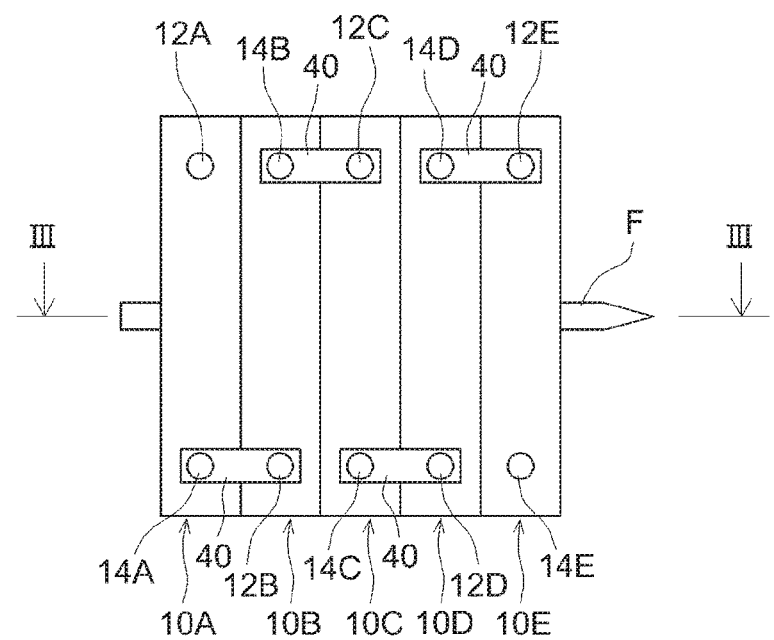
FIG. 2 is a plan view schematically showing the battery pack according to an embodiment of the present invention and a conductive foreign matter which puncturing the battery pack.
Figure 3:
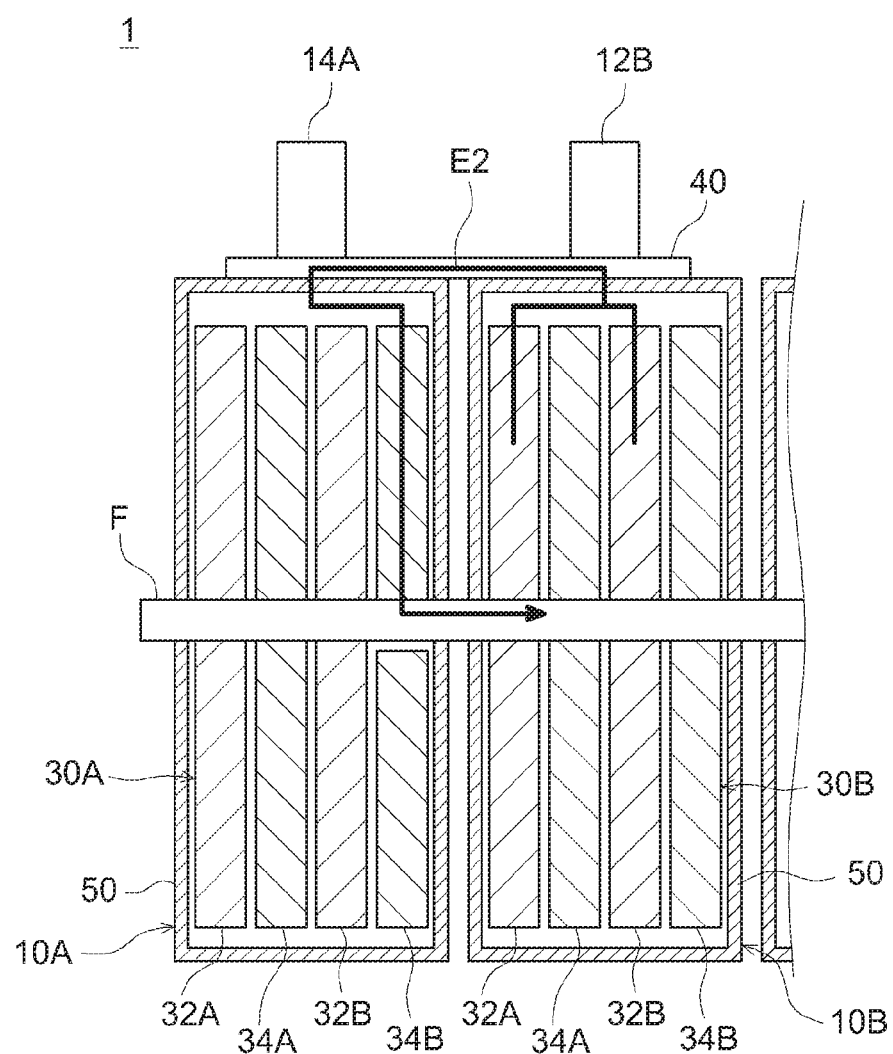
FIG. 3 is a cross-sectional view taken along the line of the battery pack shown in FIG. 2, schematically showing the internal structure of the battery pack according to an embodiment of the present invention and a conductive foreign matter which puncturing the battery pack.
Figure 4:
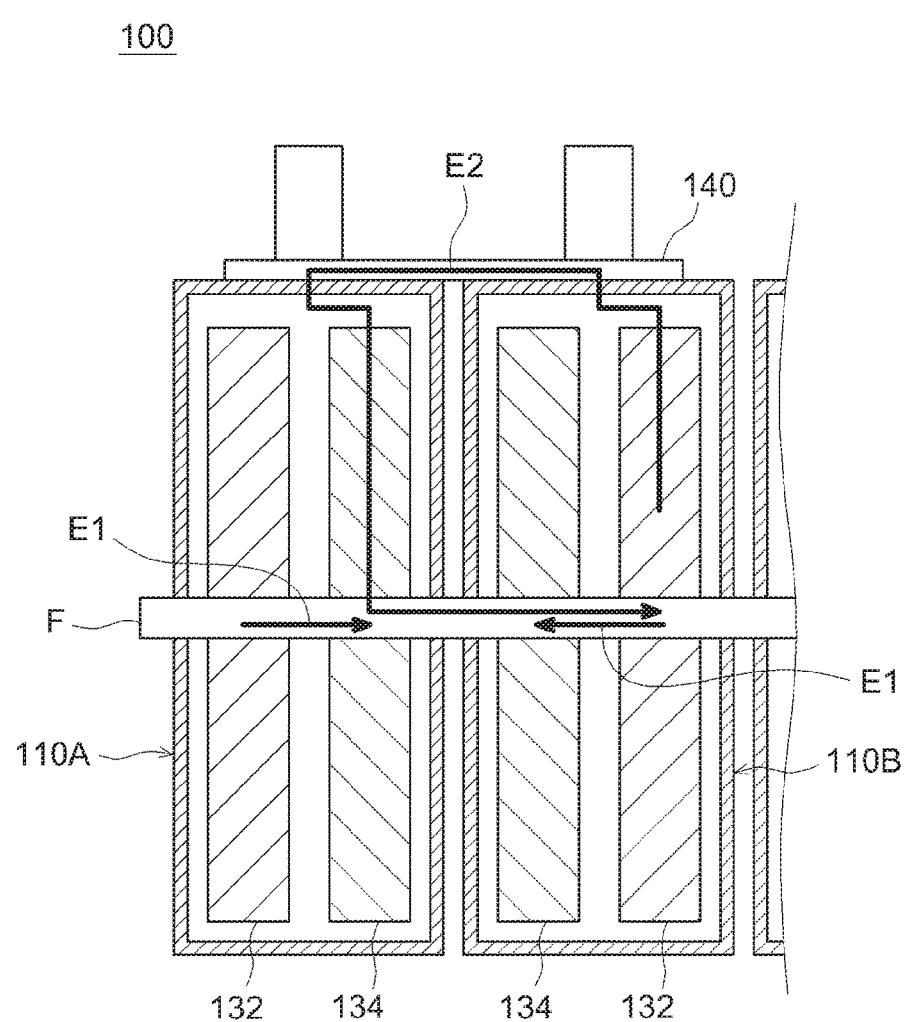
FIG. 4 is a cross-sectional view schematically showing the internal structure of a conventional battery pack and a conductive foreign matter which puncturing the battery pack.

FIGS. 1 and 2 are each a diagram schematically showing the battery pack according to the present embodiment and a conductive foreign matter, FIG. 1 being a perspective view and FIG. 2 a plan view. FIG. 3 is a cross-sectional view taken along the line of the battery pack shown in FIG. 2, schematically showing the internal structure of the battery pack according to the present embodiment and a conductive foreign matter which puncturing the battery pack.

(1) Entire Configuration of the Battery Pack

As shown in FIGS. 1 and 2, a battery pack 1 according to the present embodiment has a configuration in which a plurality of single cells of an identical shape are arranged adjacent to each other, wherein positive and negative electrode terminals between the adjacent single cells are electrically connected alternately in series. Specifically, the battery pack 1 according to the present embodiment is configured by five single cells 10A to 10E. The single cells 10A to 10E have positive electrode terminals 12A to 12E and negative electrode terminals 14A to 14E, respectively, wherein the electrode terminals are connected to one another by bus bars 40. The number of single cells configuring the battery pack is not particularly limited.

Among the five single cells 10A to 10E arranged in the battery pack, the single cell 10A disposed at one end of the arrangement direction has the positive electrode terminal 12A serving as a positive electrode output terminal that is opened so as to be connectable to the outside. The single cell 10E disposed at the other end of the arrangement direction has the negative electrode terminal 14E serving as a negative electrode output terminal that is opened so as to be connectable to the outside.

In the following description, the single cell with this positive electrode output terminal 12A is the first single cell 10A, and the single cell with the negative electrode output terminal 14E is the fifth single cell 10E. The first single cell 10A side corresponds to the upstream side in the arrangement direction, and the fifth single cell 10E side corresponds to the downstream side in the arrangement direction. In other words, in the following description, the left-hand side of FIGS. 1 to 3 is the upstream side, and the right-hand side the downstream side.

When installing the battery pack 1 according to the present embodiment in a mobile object such as a vehicle, the battery pack 1 is installed in such a manner that the upstream side (the first single cell 10A side) is disposed in the front side in the direction of travel of the mobile object. In other words, the battery pack 1 is disposed in such a manner that when a sharp conductive foreign matter F such as a nail comes flying into the mobile object installed with the battery pack 1 while the mobile object is moving, the sharp conductive foreign matter F punctures into the battery pack from the upstream side toward the downstream side (from the first single cell 10A toward the fifth single cell 10E side) in the arrangement direction.

(2) Configuration of the Single Cells

Each of the single cells 10A to 10E configuring the battery pack 1 according to the present embodiment is described next.

As will be described hereinafter in detail, when the single cells 10A to 10E of the battery pack according to the present embodiment are connected, the positive and negative electrodes of the single cells in the odd-numbered columns (the first, third and fifth single cells) are layered in reverse order from the positive and negative electrodes of the single cells in the even-numbered columns (the second and fourth single cells), so that the positive and negative electrodes of all the single cells 10A to 10E are layered in the same order.

Hereinafter, the first single cell 10A is described as an example of a single cell of an odd-numbered column, and the second single cell 10B is described as an example of a single cell of an even-numbered column. As to FIG. 3, the descriptions of the third and subsequent single cells are omitted for the same reason.

As shown in FIG. 3, the single cells 10A, 10B have layered electrode bodies 30A, 30B in which a plurality of rectangular positive electrode sheets 32A, 32B and negative electrode sheets 34A, 34B are layered alternately with separators therebetween (not shown), and square battery cases 50 corresponding to the layered electrode bodies 30A, 30B respectively.

(a) Battery Case

The battery cases 50 are each configured with a flat, rectangular cuboid-shaped case main body with an opened upper surface and a lid body for closing the opened portion of the upper surface. Note that the battery cases 50 are not necessarily made of metal but may be made from resin or laminated film.

The lid body configuring the upper surface of each battery case 50 is provided with the positive electrode terminals 12A, 12B and negative electrode terminals 14A, 14B described above. The positive electrode terminals 12A, 12B are connected to the positive electrode sheets of the layered electrode bodies 30A, 30B, and the negative electrode terminals 14A, 14B are connected to the negative electrode sheets. Note that the positive electrode terminals 12A, 12B are preferably configured with, for example, aluminum, aluminum alloy or the like, and the negative electrode terminals 14A, 14B are preferably configured with copper, copper alloy or the like.

(b) Electrolyte

The battery cases 50 described above are filled with the layered electrode bodies 30A, 30B and a nonaqueous electrolyte (typically a liquid-type or polymer-type (gelled) nonaqueous electrolyte). Nonaqueous electrolytes same as those that have conventionally been used in lithium-ion secondary cells can be used with no particular limitation.

(c) Layered Electrode Bodies

Next, the layered electrode bodies 30A, 30B are explained concretely with reference to FIG. 3. The layered electrode bodies 30A, 30B are configured by layering the positive electrode sheets 32A, 32B and negative electrode sheets 34A, 34B. The battery pack 1 according to the present embodiment is configured in such a manner that the direction of layering of the positive and negative electrodes is the same as the arrangement direction of the single cells 10A to 10E.

After describing hereinafter the constituent materials of the positive electrode sheets 32A, 32B and the negative electrode sheets 34A, 34B, the structure of layering the layered electrode bodies 30A, 30B is described.

(c-1) Positive Electrode Sheets

The positive electrode sheets 32A, 32B are each configured by forming a positive electrode active material layer on the surface of a positive electrode current collector made of a rectangular piece of aluminum foil or the like. The positive electrode active material layer includes a positive electrode active material and other additives (such as conductive materials and binders).

A lithium-containing compound containing a lithium element and one or two or more types of transition metal elements (lithium transition metal compound oxide) can be used as this positive electrode active material. Examples of the lithium transition metal compound oxide include such as lithium-nickel compound oxide (e.g., $LiNiO_2$), lithium-cobalt compound oxide (e.g., $LiCoO_2$), lithium-manganese compound oxide (e.g., $LiMn_2O_4$). In addition, another examples of the lithium transition metal compound oxide include ternary lithium-containing compound oxides such as lithium-nickel-cobalt-manganese compound oxide (e.g., $LiNi_{1/3}Co_{1/3}Mn_{1/3}O_2$).

The ones that have conventionally been used in this type of lithium-ion secondary cell can be used with no particular limitation as the other additives that can be contained in the positive electrode active material layers. For example, carbon materials such as carbon black and other carbon powder and carbon fibers can be added as the conductive materials. Polymer materials that dissolve in organic solvents, such as halogenated vinyl resins such as polyvinylidene fluoride (PVDF) and polyvinylidene chloride (PVDC), polyalkylene oxide such as polyethylene oxide (PEO), and the like, water-soluble polymer materials or water-dispersible polymer materials such as polytetrafluoroethylene (PTFE), carboxymethyl cellulose (CMC), and styrene-butadiene rubber (SBR), may be added as the binders.

(c-2) Negative Electrode Sheets

The negative electrode sheets 34A, 34B are each configured by forming a negative electrode active material layer containing a negative electrode active material on the surface of a negative electrode current collector made of a rectangular piece of copper foil or the like. The negative electrode active material layer includes a negative electrode active material and other additives.

The types of the negative electrode active material are not particularly limited, and therefore one type of material that can be used as the negative electrode active material of this type of secondary cell can be used alone or two or more types of such materials can be combined (mixed or made into a composite), for example. Preferred examples of this negative electrode active material include carbon materials such as graphite, non-graphitizable carbon (hard carbon), easily graphitizable carbon (soft carbon), carbon nanotubes, and a combination thereof. Use of a graphite material is particularly preferred. For example, a graphite material having its surface coated with amorphous carbon can favorably be employed.

Furthermore, as with the positive electrode active material layers described above, the one that have conventionally been used in this type of lithium-ion secondary cell can be used as the other additives of the negative electrode active material layers. The materials same as those of the positive electrode active material layers described above can be used as the binders. In addition, thickeners, dispersants and the like can appropriately be used as the other additives. Examples of the thickeners include carboxymethyl cellulose (CMC) and methyl cellulose (MC).

(c-3) Separators

Although the illustration is omitted in FIG. 3, the separators are disposed between the positive electrode sheet 32A and the negative electrode sheet 34A and between the positive electrode sheet 32B and the negative electrode sheet 34B. Separators that are used in typical lithium-ion secondary cells can be used as these separators (e.g., porous sheets (films) made of resins such as polyethylene (PE), polypropylene (PP), polyester, cellulose, and polyamide). For convenience of explanation, descriptions of the separators are omitted hereinafter.

(c-4) Layered Structure of the Layered Electrode Bodies

A layered structure of the layered electrode bodies 30A, 30B according to the present embodiment is described next. The battery pack 1 according to the present embodiment has the layered electrode bodies in which all of the first to fifth single cells 10A to 10E have the following configuration.

As shown in FIG. 3, the layered electrode bodies 30A, 30B according to the present embodiment are configured by sequential layering of the positive electrode sheet 32A on the upstream side, the negative electrode sheet 34A on the uppermost stream side, the positive electrode sheet 32B on the downstream side, and the negative electrode sheet 34B on the lowermost stream side, from the upstream side toward the downstream side in the arrangement direction of the single cells (the direction of layering of the layered electrode bodies).

In the layered electrode body 30A according to the present embodiment, the negative electrode sheet 34B on the lowermost stream side is configured to have a lower electric resistance than the other negative electrode sheet (the negative electrode sheet 34A on the uppermost stream side). For this reason, when a short-circuit current E2 flows from the second single cell 10B to the first single cell 10A through the bus bars 40 due to the conductive foreign matter F penetrating both of the single cells 10A, 10B, the short-circuit current E2 can concentrically flow into the negative electrode sheet 34B on the lowermost stream side. In order to make the electric resistance of the negative electrode sheet 34B of the lowermost stream side lower than that of the negative electrode sheet 34A of the uppermost stream side as described above, it is preferred that, for example, the weight per unit area of the negative electrode active material layer of the negative electrode sheet 34B on the lowermost stream side be 25% to 75% (preferably 50%) of the weight per unit area of the negative electrode active material layer of the negative electrode sheet 34A on the uppermost stream side.

Moreover, in the present embodiment, the negative electrode sheet 34B on the lowermost stream side is configured to break at a temperature lower than a temperature at which the other negative electrode (the negative electrode sheet 34A on the uppermost stream) breaks. Therefore, when the short-circuit current E2 flows concentrically into the negative electrode sheet 34B on the lowermost stream side, Joule heating of the short-circuit current E2 can break the negative electrode sheet 34B on the lowermost stream side, shutting off the shirt-circuit current E2. In order to break the negative electrode sheet 34A of the uppermost stream side at a lower temperature in this manner, it is preferred that, for example, the thickness of the negative electrode current collector of the negative electrode sheet 34B on the lowermost stream side be 70% to 90% (preferably 80%) of the thickness of the negative electrode current collector of the negative electrode sheet 34A on the uppermost stream side.

As described above, according to the present embodiment, when the short-circuit current E2 flows from the second single cell 10B to the first single cell 10A through the bus bars 40 due to the conductive foreign matter F penetrating the single cells 10A, 10B, the short-circuit current E2 can flow concentrically into the negative electrode sheet 34B on the lowermost stream side, and then Joule heating of the short-circuit current E2 can break the negative electrode sheet 34B on the lowermost stream side. As a result, the short-circuit current E2 can be shut off, preventing the Joule heating of the short-circuit current E2 from raising the internal temperature of the second single cell 10B.

In addition, in the battery pack 1 according to the present embodiment, the third and subsequent single cells 10C to 10E, too, are configured in such a manner that the negative electrode sheet 34B on the lowermost stream side has a lower electric resistance and breaks at a lower temperature, as with the single cells 10A, 10B described above. Therefore, in the third and subsequent single cells 10C to 10E as well, when the short-circuit current E2 is flowing through the bus bars 40 is generated, the short-circuit current E2 can be caused to flow concentrically to the negative electrode sheet 34B on the lowermost stream side, and then Joule heating of the short-circuit current E2 can break the negative electrode sheet 34B on the lowermost stream side, shutting off the short-circuit current E2.

The present embodiment can provide a battery pack having a high level of safety. Specifically, the present embodiment can provide can appropriately prevent the elevation of the internal temperatures of the single cells 10A to 10E, thereof prevent the physical or chemical stability of the single cells 10A to 10E from being ruined due to denaturation of the internal materials thereof by heat.

In a case where the negative electrode sheet 34B on the lowermost stream side breaks, there is a possibility that the short-circuit current E2 flows into the negative electrode sheet 34A on the uppermost stream side, but most of the short-circuit current E2 that is generated due to the conductive foreign matter F penetrating the single cells 10A, 10B is consumed before the negative electrode sheet 34B on the lowermost stream side breaks. For this reason, a short-circuit current that significantly increases the temperatures of the single cells is extremely less likely to flow into the negative electrode sheet 34A on the uppermost stream side. The inventors of the present invention have experimentally validated this fact.

In addition, the foregoing embodiment is not intended to limit the number of positive electrode sheets and the number of negative electrode sheets. In a case where three or more positive and negative electrode sheets are layered in the battery pack disclosed herein, the negative electrode sheet on the lowermost stream side is configured to have a lower electric resistance and to break at a lower temperature than all the other negative electrode sheets. Such a configuration can not only cause a short-circuit current to flow concentrically to the negative electrode sheet on the lowermost stream side but also cause this negative electrode sheet on the lowermost stream side to break easily.

In the battery pack 1 according to the embodiment described above, of all the single cells 10A to 10E configuring the battery pack 1, the negative electrode sheet that is configured to have a lower electric resistance and to break easily is disposed on the lowermost stream side in the layering direction. The n-th single cell disposed on the lowermost stream side in the arrangement direction (the fifth single cell 10E in FIG. 1), on the other hand, the other single cells are not disposed on the downstream side and the short-circuit current E2 does not flow thereto through the bus bars; thus, these single cells do not necessarily have a negative electrode sheet that has a lower electric resistance and breaks easily.

2. Method for Manufacturing Battery Pack

A method for manufacturing the battery pack 1 according to the present embodiment is described next.

The manufacturing method according to the present embodiment is the same as a conventional method for manufacturing a battery pack in terms of preparing a plurality of single cells and connecting the electrode terminals of these single cells using bus bars.

However, the difference with the conventional method for manufacturing a battery pack is that the manufacturing method according to the present embodiment prepares two types of single cells having different structures for the layered electrode bodies in which a negative electrode sheet that has a lower electric resistance than the other negative electrode sheets and breaks at a temperature lower than temperatures at which the other negative electrode sheets break, is used as the negative electrode sheet 34B on the lowermost stream side, as described above.

Specifically, in manufacturing the battery pack 1, because the positive electrode terminals 12A to 12E and the negative electrode terminals 14A to 14E are connected by the bus bars 40 as shown in FIG. 2, the single cells 10B, 10D in the even-numbered columns are turned 180°. Therefore, in order to match all the orders of layering for the positive and negative electrodes of all the connected single cells 10A to 10E as shown in FIG. 3, the manufacturing method according to the present embodiment prepares two types of single cells in which the orders of layering for the positive and negative electrodes of the single cells 10A, 10C, 10E in the odd-numbered columns and the single cells 10B, 10D in the even-numbered columns are reversed.

When preparing the single cells 10A, 10C, 10E of the odd-numbered columns, as shown in the first single cell 10A in FIG. 3, the manufacturing method according to the present embodiment prepares the layered electrode body 30A in which the positive electrode sheet 32A of the upstream side, the negative electrode sheet 34A of the uppermost stream side, the positive electrode sheet 32B of the downstream side, and the negative electrode sheet 34B of the lowermost stream side are layered in this order, and then stores this layered electrode body 30A in the corresponding battery case 50 along with the electrolyte.

On the other hand, when preparing the single cells 10B, 10D of the even-numbered columns shown in FIG. 1, the manufacturing method according to the present embodiment prepares the single cells in which the orders of layering for the positive and negative electrodes are the opposite of those in the single cells 10A, 10C, 10E of the odd-numbered columns described above. In other words, the manufacturing method according to the present embodiment prepares the layered electrode body 30B in which the negative electrode sheet 34B of the lowermost stream side, the positive electrode sheet 32B of the downstream side, the negative electrode sheet 34A of the uppermost stream side, and the positive electrode sheet 32A of the upstream side are layered in this order, and then stores this layered electrode body 30B in the corresponding battery case 50 along with the electrolyte.

Then, the single cells 10B, 10D in the even-numbered columns having the orders of layering for the positive and negative electrodes reversed, are turned 180°, and then the positive electrode terminals 12A to 12E and negative electrode terminals 14A to 14E of the single cells 10A to 10E are connected sequentially by the bus bars 40, thereby completing the manufacturing of the battery pack 1 in which all the single cells 10A to 10E have the positive electrode sheet 32A of the upstream side, the negative electrode sheet 34A of the uppermost stream side, the positive electrode sheet 32B of the downstream side, and the negative electrode sheet 34B of the lowermost stream side disposed in this order from the upstream side toward the downstream side in the arrangement direction.

TEST EXAMPLES

Test examples according to the present invention are described hereinafter; however, the following test examples are not intended to limit the present invention.

1. Test Example 1 to Test Example 4

A positive electrode active material layer having a positive electrode active material ($LiNi_{1/3}CO_{1/3}Mn_{1/3}O_2$), a conductive material (acetylene black) and a binder (polyvinylidene fluoride) mixed at a mass ratio of 94:3:3 was formed on both surfaces of a positive electrode current collector (aluminum foil) to form a rectangular positive electrode sheet.

On the other hand, a negative electrode active material layer having a negative electrode active material (graphite), a thickener (carboxymethyl cellulose), and a binder (styrene-butadiene rubber) mixed at a mass ratio of 98:1:1 was formed on both surfaces of a negative electrode current collector (copper foil) to prepare a rectangular negative electrode sheet. According to the present test examples, the weight per unit areas of the negative electrode active material layers of the negative electrode sheets disposed on the lowermost stream side and the thicknesses of the negative electrode current collectors were made different from one another among test example 1 to test example 4, as shown in Table 1. Note that, in the present test examples, layered electrode bodies were prepared in which the orders of layering for the positive and negative electrodes were reversed in the single cells in the even-numbered columns so that the orders in which the positive and negative electrodes are layered were the same among the single cells of the odd-numbered columns and the single cells of the even-numbered columns.

Next, lithium-ion secondary cells (single cells) were prepared by storing each of the layered electrode bodies prepared as described above in battery cases along with the electrolyte. Among the five single cells, the single cells disposed in the even-numbered columns were turned 180° and the positive and negative electrode terminals of each of the single cells were connected by bus bars, thereby preparing battery packs for test example 1 to test example 4.

2. Evaluation Test

The following nail penetration test was conducted as an evaluation test for the battery packs prepared as described above.

Specifically, under a temperature environment of 25° C., the SOCs of the battery packs of test example 1 to test example 4 were adjusted to 80%. Next, two thermocouples were attached to the outer surface of each battery case, and, under the temperature environment of 25° C., an iron nail with a diameter of 6 mm and a tip sharpness of 30° was put at right angle into the vicinity of the center of the wide surface of each square battery case at a speed of 20 mm/sec, to penetrate all of the single cells configuring each battery pack. Changes in temperature of the single cells (cells) configuring the battery pack of each test example were measured. The highest temperatures of the battery packs of the respective test examples that were obtained during the measurement are shown in Table 1.

TABLE 1

| | Thickness of negative electrode current collector of negative electrode on lowermost stream side | Weight per unit area of negative electrode active material layer of negative electrode on lowermost stream side | Highest temperature (° C.) | |
|---|---|---|---|---|
| | | | First cell | Second to fifth cells |
| Test example 1 | 100% | 100% | 575 | 660 |
| Test example 2 | 80% | 100% | 575 | 620 |
| Test example 3 | 100% | 50% | 575 | 620 |
| Test example 4 | 80% | 50% | 575 | 575 |

3. Evaluation Results

As shown in Table 1, as a result of the nail penetration tests, test examples 1 to 3 indicates that the highest temperatures of the second cell and the subsequent cells were higher than the highest temperature of the first cell. This is understood to be because a short-circuit current flowing through the bus bars has occurred and Joule heating of this short-circuit current has heated up the second single cell and the subsequent single cells.

Test example 4, on the other hand, indicates that the highest temperatures remained 575° C. in all single cells. This result confirms that the configuration in which the electric resistance of the negative electrode sheet on the lowermost stream side is reduced and a short-circuit current flowing through the bus bars is caused to flow concentrically into the negative electrode sheet on the lowermost stream side and the negative electrode sheet on the lowermost stream side breaks at a low temperature, can appropriately shut off the short-circuit current flowing through the bus bars, preventing Joule heating of this short-circuit current from heating up the second single cells and the subsequent single cells.

What is claimed is:

1. A battery pack comprising
a plurality of single cells of an identical shape arranged adjacent to each other, the adjacent single cells having positive and negative electrode terminals electrically connected alternately in series,
wherein, among the plurality of arranged single cells, the single cell located at one end of the arrangement direction has the positive electrode terminal serving as a positive electrode output terminal that is opened so as to be connectable to an outside, and the single cell located at the other end of the arrangement direction has the negative electrode terminal serving as a negative electrode output terminal that is opened so as to be connectable to an outside,
each of the single cells has a layered electrode body in which a plurality of rectangular positive and negative electrode sheets are layered alternately with separators therebetween, and a square battery case corresponding to the layered electrode body, the direction of layering of the positive and negative electrodes configuring the layered electrode body being the same as the arrangement direction of the plurality of single cells, and
when the single cell that has the positive electrode output terminal and is located at one end is a first single cell, and the single cell that has the negative electrode output terminal and is located at an other end is an n-th single cell, and a side in the arrangement direction where the first single cell is located corresponds to an upstream side whereas a side where the n-th single cell is located corresponds to a downstream side,
among a plurality of positive and negative electrode sheets that configure the layered electrode body of each of the single cells from the first single cell to at least an n−$1^{th}$ single cell, a negative electrode sheet is disposed on a lowermost stream side in the arrangement direction, and the negative electrode sheet disposed on the lowermost stream side has a lower electric resistance than the other negative electrode sheets configuring the layered electrode body and breaks at a temperature lower than temperatures at which the other negative electrode sheets break.

2. The battery pack according to claim 1, wherein the weight per unit area of a negative electrode active material layer of the negative electrode sheet disposed on the lowermost stream side is 25% to 75% of the weight per unit area of negative electrode active material layers of the other negative electrode sheets.

3. The battery pack according to claim 1, wherein the thickness of a negative electrode current collector of the negative electrode sheet disposed on the lowermost stream side is 70% to 90% of the thicknesses of negative electrode current collectors of the other negative electrode sheets.

* * * * *